No. 882,578. PATENTED MAR. 24, 1908.
J. NELSON.
STREET SWEEPER.
APPLICATION FILED OCT. 21, 1907.
2 SHEETS—SHEET 1.
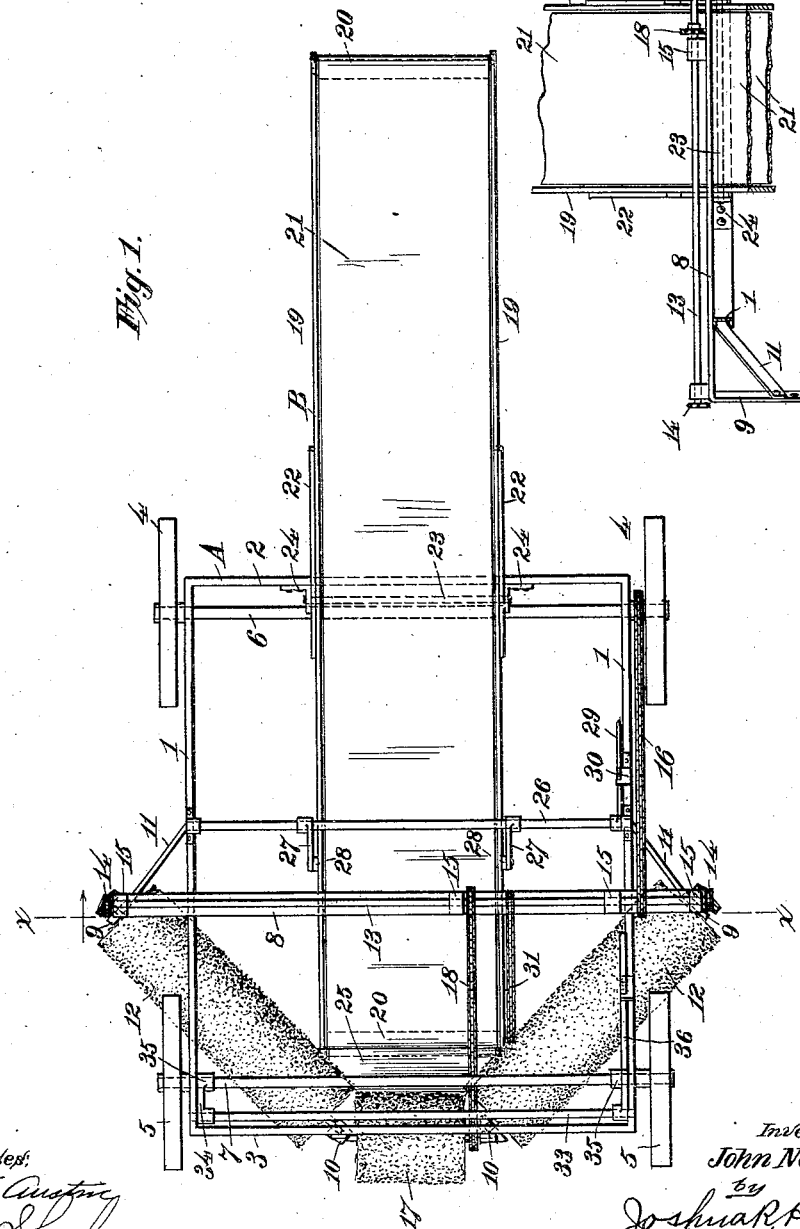
Witnesses:
Inventor.
John Nelson
by
Joshua R. H. Potts
Atty.

No. 882,578. PATENTED MAR. 24, 1908.
J. NELSON.
STREET SWEEPER.
APPLICATION FILED OCT. 21, 1907.
2 SHEETS—SHEET 2.
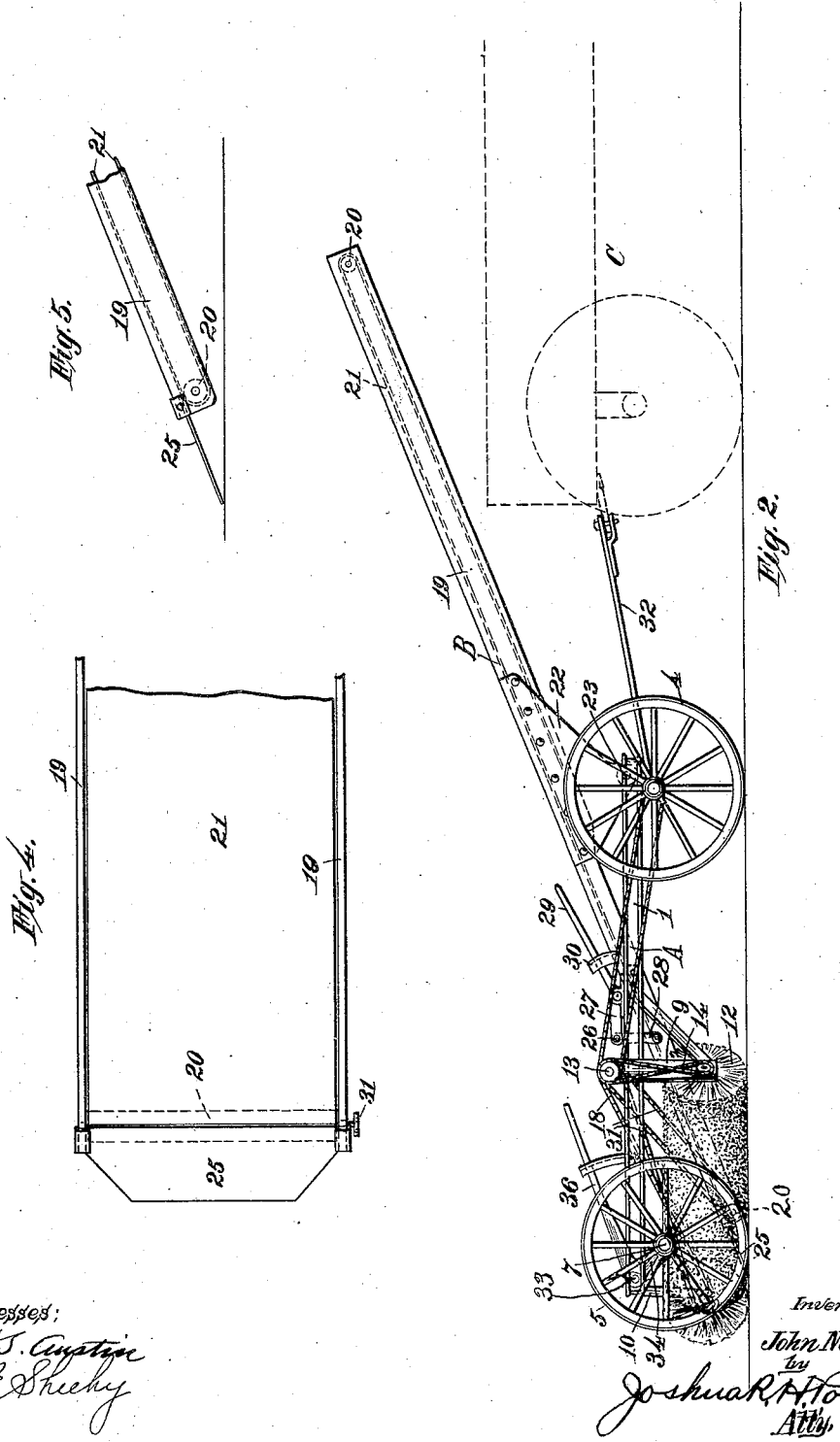

UNITED STATES PATENT OFFICE.

JOHN NELSON, OF CHICAGO, ILLINOIS.

STREET-SWEEPER.

No. 882,578.  Specification of Letters Patent.  Patented March 24, 1908.

Application filed October 21, 1907. Serial No. 398,321.

*To all whom it may concern:*

Be it known that I, JOHN NELSON, a subject of the King of Denmark, residing in Chicago, county of Cook, and State of Illinois, have invented certain new and useful Improvements in Street-Sweepers, of which the following is a specification.

My invention relates to street-sweepers and has for its object to provide a street-sweeper adapted to be attached to the back of a cart or wagon and which shall collect the sweepings and deposit them in said cart or wagon.

My invention is embodied in a street-sweeper comprising a main frame mounted upon wheels and equipped with means for attaching the sweeper to the rear end of a wagon or cart, an auxiliary frame pivotally mounted upon said main frame and carrying a conveyer belt and provided with a shoe at its lower end and a plurality of rotary brushes for collecting the dirt and depositing it upon said shoe and conveyer belt.

My invention further consists in means for adjusting the height of the shoe from the ground and in various details of construction and arrangements of parts all as will be hereinafter fully described and particularly pointed out in the claims.

My invention will be more readily understood by reference to the accompanying drawings forming a part of this specification and in which, Figure 1 is a plan view of a street-sweeper embodying my invention, Fig. 2 is a side elevation thereof, Fig. 3 is a cross section on the line $x$—$x$ of Fig. 1, Fig. 4 is a detail plan view upon an enlarged scale illustrating the arrangement of the shoe at the lower end of the belt or conveyer frame, and Fig. 5 is a side elevation thereof.

Referring to the drawings, A indicates the rectangular main frame, of the device. This is preferably made of channel iron and comprises side members, 1—1, the front member, 2, and the rear member, 3. The frame is mounted upon the wheels, 4 and 5, the axle, 6 of the front wheels, 4, being fixed to the frame and the rear axle, 7, attached thereto in the manner hereinafter described. The frame is completed by the transverse member, 8, and the depending members, 9 and 10, in the lower ends of which are journaled the rotary brushes. The members, 9 are arranged at the ends of the transverse member, 8, and are braced by the stays, 11—11, and the members, 10 depend from the frame member, 3 to which they are rigidly attached. 12—12 indicate the angularly disposed brushes. These are driven from a transverse shaft, 13, by sprocket gearing, 14. The shaft, 13 is mounted in bearings, 15, upon the transverse member, 8, and is driven from one of the wheels, 4 by sprocket gearing, 16. 17 indicates a third brush arranged between the brushes, 12, and driven from the shaft, 13, by sprocket gearing, 18.

Pivotally mounted upon the front member, 2, of the frame A is the auxiliary or conveyer frame B. This comprises the side members, 19—19 connected at their upper and lower ends by the axles of the rollers, 20, upon which the conveyer belt, 21 is mounted. Secured to each of the members, 19 is a plate, 22, pivotally attached to a shaft, 23 mounted in brackets 24, upon the member, 2. Riveted or otherwise securely fixed to the lower end of the members, 19, is a shoe, 25, which preferably extends partially under the brush, 17, and the inner ends of the brushes, 12.

When the street which is being swept, is smooth, the shoe, 25 is permitted to drag upon the ground, but if the street is rough, the shoe must be lifted a short distance from the ground, the distance being governed by the condition of the road or street. To regulate the height of the shoe, I provide the following mechanism. Extending transversely of the frame A is a shaft, 26, mounted in brackets, upon the side members, 1—1. Pivotally fixed to the shaft, 26 are a pair of arms, 27 which are connected by links, 28, to the members, 19 and fixed to one end of the shaft is a lever, 29. It is obvious that by depressing the lever, 29, the frame B will be swung upon its pivot raising the shoe from the ground. 30 indicates a segment for holding the lever, hence, the shoe, in proper position. The belt may be driven in any suitable manner. In the drawings, I have illustrated one of the rollers, 20 connected with the shaft, 13, by sprocket gearing, 31, for this purpose.

The conveyer belt and its frame are of sufficient length, and at a sufficient angle to extend above a wagon or cart C, indicated in dotted lines in Fig. 2. In using the device it is secured behind the wagon by a draft member, 32, and as it is drawn along deposits the dirt in the wagon. The brushes, 12 sweep the dirt inwardly toward the center of the machine and in front of the brush, 17, which sweeps it onto the shoe and the belt, 21.

When the machine is being moved from one locality to another when not in operation, it is desirable to lift the brushes and also the shoe out of contact with the ground. To this end, I provide means for raising the rear end of the frame A. Extending transversely of the frame A near its rear end is a shaft, 33, to which are rigidly fixed arms, 34, having bearings 35 in their ends for the rear axle, 7.

36 indicates a lever rigidly fixed upon the shaft, 33. By depressing the lever, the arms, 34 are swung, raising the rear end of the machine with relation to the rear axle and moving the brushes and the shoe out of contact with the ground.

Having described my invention what I claim as new and desire to secure by Letters Patent is:

1. In a street-sweeper, a main frame mounted upon wheels and provided with means for attaching it to a wagon or cart, in combination with an auxiliary frame pivotally mounted on said main frame, a belt arranged in said auxiliary frame, a shoe arranged at the lower end of said auxiliary frame, a plurality of brushes for sweeping the street and depositing the sweepings on said belt and means for regulating the height of the shoe from the ground, said means comprising a transverse shaft mounted on said main frame, a pair of arms rigidly fixed thereto, links connecting said arms with said auxiliary frame and a lever for turning said shaft, substantially as described.

2. In a street sweeper, a main frame mounted upon wheels and provided with means for attaching it to a wagon or cart, in combination with an auxiliary frame pivotally mounted on said frame, a belt arranged in said auxiliary frame, a pair of angularly disposed brushes arranged upon said main frame, a smaller brush arranged between the adjacent ends of the first said brushes and a shoe arranged at the lower end of said auxiliary frame between the inner ends of said angularly disposed brushes, said smaller brush and the lower end of said belt, and overhanging the latter, substantially as described.

In testimony whereof, I have signed my name to this specification in the presence of two subscribing witnesses.

JOHN NELSON.

Witnesses:
    FRANCES E. SHEEHY,
    ANNA GALLAGHER.